United States Patent Office 3,798,146
Patented Mar. 19, 1974

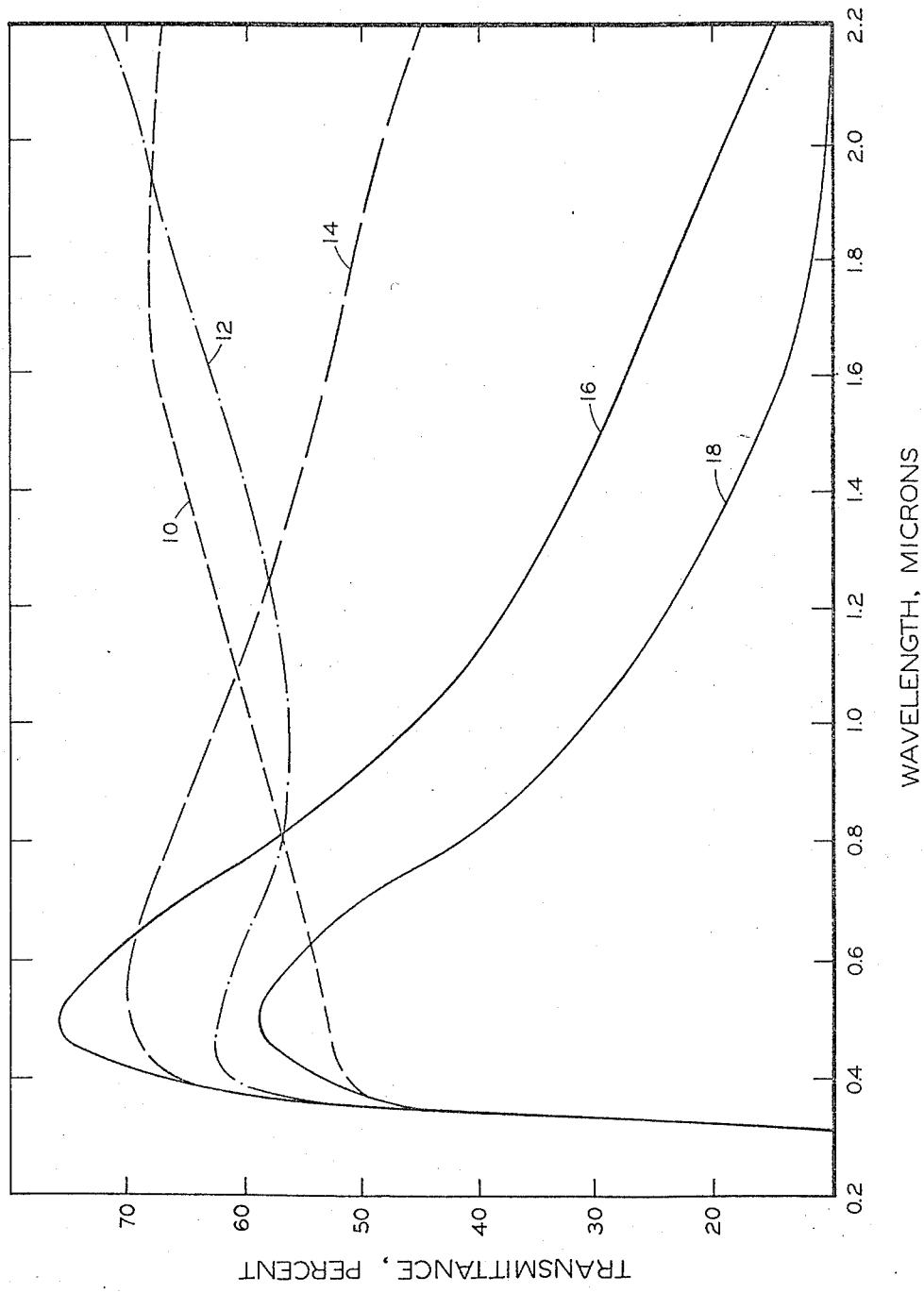

3,798,146
METHOD OF MAKING A TRANSPARENT ARTICLE HAVING REDUCED RADIATION TRANSMITTANCE
Chong T. Wan, Douglas L. Chambers, and Donald C. Carmichael, Columbus, Ohio, assignors to Shatterproof Glass Corporation, Detroit, Mich.
Continuation of abandoned application Ser. No. 114,823, Feb. 12, 1971. This application June 6, 1973, Ser. No. 367,585
Int. Cl. C23c 15/00
U.S. Cl. 204—192                                5 Claims

ABSTRACT OF THE DISCLOSURE

A transparent article having reduced radiation transmittance which comprises a body of transparent glassy siliceous material having a smooth continuous surface, a continuous intermediate layer sputter-coated on the continuous surface to a thickness of from 10 to 200 A., the intermediate layer being of a metal selected from the group consisting of molybdenum, titanium, chromium, tungsten, tantalum, and their alloys, and a continuous film sputter-coated on the continuous intermediate layer to a thickness of from 100 to 500 A., the film being of a metal selected from the group consisting of gold, gold-base alloys, copper and copper-base alloys.

BACKGROUND OF THE INVENTION

This application is a continuation of pending application Ser. No. 114,823, filed Feb. 12, 1971, now abandoned.

This invention relates to transparent articles having reduced radiation transmittance and reduced glare. It is particularly concerned with transparent articles having a continuous film coating of gold, gold-base alloys, copper, or copper-base alloys.

The architectural trend toward using more glass in commercial buildings has been enhanced by the availability of special coated and tinted glasses which not only serve an aesthetic purpose but also are functional. The most significant advantages of the special glasses are in the area of air conditioning. Since it generally costs from three to six times more to cool a building one degree than to heat it by the same amount (depending on the amount of glass used), the use of an exterior glass which will reduce the amount of solar radiation entering a building can provide substantial savings since less air conditioning equipment is required and its operation is less costly. The special glasses are also used in other areas where low heat transmittance is required, i.e., automobile windows and oven windows.

Over the past decade the market for colored and reflective glass has grown significantly. The colored glass involved is basically of two types—tinted and coated. Tinted glass is generally made by adding selected metals such as iron, cobalt, and nickel to the molten glass during production. This method of producing colored glass is time consuming and wasteful in that when a different color of glass is desired, a four- or five-day run of glass must be discarded while the change is made and the new batch stabilized. Also, large quantities of different colors and types of glass must be inventoried. In addition, although tinted glass does reduce glare, it also absorbs heat (including solar radiation) and the absorbed heat is re-radiated from both sides of the glass. Therefore, a greater amount of heat is allowed to pass through the glass than with coated glass.

Coated or reflective glass is provided with a thin film of a reflective substance on one of its surfaces. The thin film reflects the radiation much more effectively than tinted glass. Gold, gold alloys, copper, and copper alloys are particularly effective as thin film coatings because they reduce transmittance in the infra-red range significantly. However, a durable coating of these materials which will not rub or wear off the glass sheet has not been achieved without using an intermediate layer of an adhesive material. Most companies sell coated glass only in double glazing (two panes separated by an air space) and laminated forms.

When gold, gold alloys, copper, or copper alloys are deposited directly on glass or other siliceous substrates, they do not adhere to the substrate and can be readily removed by wiping with a finger or by the standard tape and eraser tests. Even depositing these materials directly by a sputtering process will not improve the adherence of the coatings significantly. We have found that by applying a continuous intermediate layer of a metal selected from the group consisting of molybdenum, titanium, chromium, tungsten, tantalum, and their alloys prior to the final coating, the adherence of the thin film coating can be significantly improved. In addition, the intermediate layer can be made thin enough as to not affect the optical properties of the finished article and still provide adequate adherence of the overlying film. In some cases, the intermediate layer can be made thick enough to impart a silvery color to one surface of the substrate.

One of the most significant problems with coated glasses is that as the thickness of the coating is increased to further reduce heat transmittance, light transmittance is also reduced. The goal is to produce a coated glass that will minimize the transmittance of radiation in the infra-red range (greater than approximately 0.75 micron in wavelength) for any selected transmittance of visible light in the visible light range (nominally 0.4 to 0.75 micron in wavelength). In other words, it is the overall effectiveness of the coated glass in regard to the entire range of wavelengths which is important.

Present commercial coated glass products are generally only available with coatings of chromium and nickel applied by techniques other than sputtering (e.g., thermal evaporation). These coatings show increasing transmittance with increasing wavelength. We have found that by sputter-coating the substrate with gold, copper, or their alloys according to the present invention, the article exhibited lower transmittance in the infra-red range than in the visible light range and that the transmittance decreased with increasing wavelength. This is significant in that a transparent glass article can be produced to admit a predetermined amount of visible light (by varying the film thickness) and at the same time admit only a minimum amount of heat for that amount of light. Therefore, optimum performance is achieved.

We have found that the sputter-coating technique as applied in the present invention produces a product having superior optical properties and improved adhesion. In addition, sputtering also has the advantage over thermal evaporation techniques in that the source (the target or cathode) is not a point or line source but a surface source. This is a particularly important advantage in applications involving coating of substrates having a large surface area. If a target surface in sputtering is made to be parallel to the substrate surface over all areas of the substrate (like a flat target placed parallel to a flat substrate), the coating thickness will be extremely uniform. Any edge effect in the thickness uniformity can be minimized by making the target dimensions two to four inches larger than the substrate dimensions. The distance between the target and the substrate surface can thus be as close as two inches and a relatively small vacuum chamber is required. Sputtering is a somewhat slower process than the thermal vacuum-evaporation process, but for the thin optical coatings of interest this process results in superior control of coating thickness and the rate is satisfactory for commercial production. Because the source (coating) material forming the target will last for a long time, sputtering is quite adaptable to a semicontinuous or continuous manufacturing operation.

Sputtering has the following advantages over the vacuum evaporation techniques currently in use for production of coated window glass and other products:

A smaller deposition chamber can be used. The vacuum evaporation technique uses one or more point sources which must scan the surface during deposition and with the larger substrates, the necessary spacing between the sources and the substrate correspondingly increases. This may require a spacing of several feet when coating large sheets of glass. The target used in sputtering may be placed much closer to the substrates since point sources are not involved.

The coating may be applied in a downward direction with the glass in a horizontal position. Vacuum evaporation can only coat in an upward direction with the glass either horizontal or vertical and this affects the uniformity of the coating.

Sputtering appears to be more reliable and maintenance free as a production system.

Sputtering allows more versatility as the materials may be easily changed from batch to batch. And a multiple-layer coating of several materials may be deposited during a single run simply by incorporating a squence of targets in the system, such as the coating of the siliceous material or aluminum oxide protective layer over the metal coating.

SUMMARY OF THE INVENTION

The present invention provides a transparent article having reduced radiation transmittance and reduced glare, which comprises a body of transparent glassy siliceous material having a smooth continuous surface, a continuous intermediate layer of molybdenum, titanium, chromium, tungsten, tantalum, or their alloys sputter-coated on the continuous surface to a thickness of from 10 to 200 A., and a continuous film of gold, gold-base alloys, copper, or copper-base alloys sputter-coated on the intermediate layer to a thickness of from 100 to 500 A. The transparent article may include a smooth continuous transparent layer of protective material overlaying said continuous film to protect said film from wear. The protective material may be a siliceous material such as silicon dioxide, silicon monoxide, or Pyrex glass, or it may be aluminum oxide. The overlaying protective layer preferably has a thickness of from 0.1 to 10 microns.

The method of preparing glass products according to the invention typically includes placing the transparent glassy siliceous body having a smooth continuous surface in a deposition chamber containing an inert gas maintained at a pressure from 5 to 50 microns; bombarding the smooth continuous surface of the body with ions of the gas to clean the surface; sputter-coating on the surface to a thickness of from 10 to 200 A. a continuous intermediate layer of a metal selected from the group consisting of molybdenum, titanium, chromium, tungsten, tantalum, and their alloys; sputter-coating on said intermediate layer to a thickness of from 100 to 500 A. a continuous film of a metal selected from the group consisting of gold, gold-base alloys, copper, and a copper-base alloys; and removing the body from the chamber. A continuous layer of protective material may be radio-frequency sputter-coated over the continuous film, preferably to a thickness of from 0.1 to 10 microns.

DESCRIPTION OF THE PREFERRED EMBODIMENT

A typical article according to the present invention comprises a body of transparent glassy siliceous material having a smooth continuous surface, a continuous intermediate layer sputter-coated on the smooth surface to a thickness of from 10 to 200 A., and a continuous reflective film sputter-coated on the intermediate layer to a thickness of from 100 to 500 A. The transparent bodies of primary concern are architectural glass, vehicle windows and oven windows, although other uses are possible. The glassy siliceous material is preferably conventional silicate glass including window glass, plate glass, and float glass, although any of the conventional or special purpose glasses may be employed as long as they are transparent. The continuous intermediate layer must have a thickness of from 10 to 200 A. Intermediate layers having a thickness less than 10 A. do not provide any significant improvement in adherence of the overlying film and those having a thickness greater than 200 A. will, when combined with the overlying reflective film, be uneconomical and also substantially impair the transmission of visible light. The continuous film must have a thickness of from 100 to 500 A. since film less than 100 A. in thickness do not provide significant reduction in solar and heat radiation transmittance and films greater than 500 A. will also substantially impair transmission of visible light in addition to being uneconomical. Generally the combined thickness of the intermediate layer and overlying film will not exceed 500 A. but the final combined thickness is determined by the desired transmittance and the density of the deposited materials.

The article may include a smooth continuous layer of transparent protective material overlaying the continuous film to protect the film from wear. The protective material is preferably a siliceous material such as silicon dioxide, including quartz, silicon monoxide, or any of the conventional or special purpose glasses such as Pyrex. The protective glass may be clear or it may be tinted to modify the color of the finished article. Any of the forms of aluminum oxide may also be used as the protective material. The protective layer is preferably from 0.1 to 10 microns in thickness. Layers less than 0.1 micron in thickness do not provide any significant protection for the film and those in excess of 10 microns are uneconomical and may involve problems where materials having coefficients of thermal expansion different from the substrate are employed.

We have found that sputter-coated films of gold, gold alloys, copper, and copper alloys, when applied over intermediate layers of certain other metals exhibit improved reduction in transmittance of solar and heat radiation when compared with other materials and processes commercially in use and, in addition, the coatings adhere well to the substrate and cannot be wiped off or removed by the standard eraser and tape tests. Referring to the figure, the graph shows the transmittance spectrum curves for various coating materials deposited on ordinary window glass one-eighth inch thick. Curve 10 represents a commercial chromium coating and curve 12 represents a commercial nickel coating, both of which were deposited by vacuum evaporation techniques. The commercial nickel coating of curve 12 had a thickness of about 230 A. whereas the commercial chromium coating of curve 10 had a thickness of about 80 A. The different thicknesses were chosen so that the transmittance spectrum curves would lie in the same area of the graph for comparison of the shapes of the curves. It should be noted that the shape of the transmittance spectrum curve is the significant feature because it is indicative of the overall performance of the article. The shape of the curve will remain essentially the same even though its position on the graph will change according to the thickness of the deposited film. In observing the shape of curves 12 and 10 for commercial nickel and chromium, it is apparent that the transmittance undesirably increases throughout the infra-red range (those wavelengths in excess of 0.75 micron). Most significant is the increase in the range from 0.75 to 1.5 microns as this is the range in which most of the solar heat radiation in the infra-red range is transmitted.

Still referring to the figure, curve 14 is the transmittance spectrum curve for an article having a sputter-coated intermediate layer of molybdenum 75 A. in thickness with an overlying film of a gold alloy 100 A. in thickness. The gold alloy comprises about 58 percent gold, 25 percent silver, and 17 percent copper. Curve 16 represents an article having a sputter-coated intermediate layer of molybdenum 50 A. in thickness with an overlying film of pure gold 100 A. in thickness. Curve 18 represents an article having an intermediate layer of molybdenum 75 A. in thickness and an overlying film of pure gold 175 A. in thickness. By comparing curves 14, 16, and 18 with curves 10 and 12 it can be seen that the sputtered gold and gold alloy over molybdenum coatings of curves 14, 16, and 18 significantly reduce the radiation transmittance over the infra-red range and especially in the range from 0.75 to 1.5 microns, whereas the commercial coatings of curves 10 and 12 show increased transmittance over these ranges. The glass sheets that were sputter-coated with gold and gold-base alloys clearly exhibit lower transmittance in the infra-red range than in the visible light range and the transmittance also decreases with increasing wavelength. It is clear from this that a transparent article can be produced which will allow transmission of a predetermined amount of visible light and at the same time allow only a minimum amount of heat radiation to pass therethrough. Thus for any thickness of coating, optimal overall performance of the article is achieved.

Gold, copper, and their alloys have very good infra-red reflectance and the color or appearance of the coating can be varied from gold to copper, bronze or silver by appropriate choice of materials. Gold, copper, and their alloys adhere very well to molybdenum, titanium, chromium, tungsten, and tantalum, and those metals in turn form a coating which is highly adherent to glass substrates.

In preparing glass products according to this invention, the body of transparent glassy siliceous material is first cleaned by a conventional washing operation and then placed in a deposition chamber containing an inert gas. The gas in the chamber is preferably maintained at a pressure of from 5 to 50 microns. At pressures below 5 microns the rate of deposition during coating is insufficient for most purposes and there is increased danger of surface contamination. At pressures above 50 microns the efficiency of the process is significantly reduced. The glass body is preferably heated to a temperature of about 250° C. prior to processing.

The smooth continuous surface is usually ion bombarded within the chamber to finally clean and prepare the surface for receiving the coating. This is generally done by the off-sputtering or reverse sputtering technique which is commonly known. Typically, the sputter-cleaning time is about twenty minutes at a power density of 0.1 to 1.0 watt/$cm^2$. With certain types of substrates and certain washing or cleaning processes (prior to insertion in the chamber), the sputter-cleaning step may be unnecessary.

The clean, smooth surface is then sputter-coated with a continuous intermediate layer of molybdenum, titanium, chromium, tungsten, tantalum, or their alloys. The coating may be done either by diode or triode sputtering techniques and is continued until a uniform coating having a thickness of from 10 to 200 A. is deposited. An overlying film of gold, gold base alloys, copper, or copper-base alloys is then sputter coated on the intermediate layer to a thickness of 100 to 500 A. Typical sputtering conditions are 5,000 volts potential on the target (coating material) and a resulting current density of 0.5 to 1.0 ma./$cm^2$ for a time period of 0.2 to several minutes depending on the thickness of coating desired.

In those cases where it is desired to deposit the protective layer over the continuous film, the coated article is preferably left in the deposition chamber and the overlayer deposited immediately by the radio-frequency sputtering technique. In such case a radio-frequency power source is connected to a separate target of the siliceous coating material to deposit a durable coating that will withstand weather and wear and can be cleaned.

It will be understood, of course, that while the forms of the invention herein shown and described constitute preferred embodiments of the invention, it is not intended to illustrate all possible forms of the invention. It will also be understood that the words used are words of description rather than of limitation and that various changes may be made without departing from the spirit and scope of the invention herein disclosed.

What is claimed is:

1. A method of preparing transparent glass articles having reduced radiation transmittance, which comprises:
    (a) placing a body of transparent glassy siliceous material having a smooth continuous surface in a deposition chamber containing an inert gas, said gas being maintained at a pressure of from 5 to 50 microns;
    (b) sputter-coating on said surface to a thickness of from 10 to 200 A. a continuous intermediate layer consisting essentially of molybdenum, titanium, chromium, tungsten or tantalum;
    (c) sputter-coating on said intermediate layer to a thickness of from 100 to 500 A. a continuous film consisting essentially of gold, gold-base alloys or copper; and
    (d) removing the coated article from the chamber;
    (e) said coated article having lower transmittance in the infra-red range of 0.75 to 1.5 microns than in the visible light range of 0.4 to 0.75 micron, with said transmittance decreasing with increasing wavelength throughout the infra-red range.

2. A method as claimed in claim 1, wherein said continuous intermediate layer consists of molybdenum sputter-coated to a thickness of 75 A., and wherein said continuous film consists of a gold alloy sputter-coated to a thickness of 100 A.

3. A method as claimed in claim 2, wherein the gold alloy forming the sputter-coated continuous film comprises about 58 percent gold, 25 percent silver, and 17 percent copper.

4. A method as claimed in claim 1, wherein said continuous intermediate layer consists of molybdenum sputter-coated to a thickness of 50 A., and wherein said continuous film consists of gold sputter-coated to a thickness of 100 A.

5. A method as claimed in claim 1, wherein said continuous intermediate layer consists of molybdenum sputter-coated to a thickness of 75 A., and wherein said continuous film consists of gold sputter-coated to a thickness of 175° A.

References Cited

UNITED STATES PATENTS 3,414,503   12/1968   Brichard _____ 204—192

JOHN H. MACK, Primary Examiner

W. A. LANGEL, Assistant Examiner